(12) United States Patent
Lee et al.

(10) Patent No.: US 8,911,229 B2
(45) Date of Patent: Dec. 16, 2014

(54) APPARATUS FOR MANUFACTURING A SEMICONDUCTOR PACKAGE

(71) Applicant: Samsung Electronics Co., Ltd., Suwon-Si, Gyeonggi-Do (KR)

(72) Inventors: Tae Yun Lee, Seoul (KR); Seong Wook Cheong, Seongnam-si (KR); Byeong Kap Choi, Seoul (KR); Sang Jin Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1 day.

(21) Appl. No.: 13/780,603

(22) Filed: Feb. 28, 2013

(65) Prior Publication Data
US 2013/0230618 A1 Sep. 5, 2013

(30) Foreign Application Priority Data
Mar. 2, 2012 (KR) .................. 10-2012-0021788

(51) Int. Cl.
*B29C 45/26* (2006.01)
*B29C 45/02* (2006.01)
*B29C 45/06* (2006.01)
B29C 45/14 (2006.01)
B29C 45/46 (2006.01)

(52) U.S. Cl.
CPC ............ *B29C 45/26* (2013.01); *B29C 45/2681* (2013.01); *B29C 45/14655* (2013.01); *B29C 45/02* (2013.01); *B29C 45/46* (2013.01); *B29C 45/06* (2013.01)
USPC ......... 425/588; 425/423; 425/544; 425/129.1

(58) Field of Classification Search
USPC ............... 425/425, 434, 588, 129.1, 116, 544
See application file for complete search history.

(56) References Cited

U.S. PATENT DOCUMENTS

| | | | | | |
|---|---|---|---|---|---|
| 2,060,474 | A | * | 11/1936 | Shriber | 164/287 |
| 4,146,565 | A | * | 3/1979 | Quraishi | 264/310 |
| 4,280,551 | A | * | 7/1981 | Ohara | 164/287 |
| 4,700,769 | A | * | 10/1987 | Ohara et al. | 164/514 |
| 5,161,600 | A | * | 11/1992 | Brodersen et al. | 164/289 |
| 5,393,215 | A | * | 2/1995 | Donovan, Sr. | 425/129.1 |
| 6,106,259 | A | * | 8/2000 | Lee et al. | 425/116 |
| 6,555,037 | B1 | * | 4/2003 | Payne | 264/40.7 |
| 7,611,657 | B2 | * | 11/2009 | Klinedinst et al. | 264/523 |
| 2008/0251974 | A1 | * | 10/2008 | Simone | 264/538 |
| 2014/0186483 | A1 | * | 7/2014 | Mizoguchi et al. | 425/425 |

* cited by examiner

*Primary Examiner* — Joseph S Del Sole
*Assistant Examiner* — Nahida Sultana
(74) *Attorney, Agent, or Firm* — Harness, Dickey & Pierce, P.L.C.

(57) ABSTRACT

An apparatus for manufacturing a semiconductor package includes at least a first mold, a rotator, and a driver. The first mold has a first mold section, a second mold section, and at least one cavity formed when the first mold section and the second mold are brought together. The rotator is coupled to the first mold, and the driver is between the first mold and a rotating axis of the rotator. The driver supplies a molding resin into the cavity based on centrifugal force generated when the rotator rotates on the rotating axis.

14 Claims, 15 Drawing Sheets

APPARATUS FOR MANUFACTURING A SEMICONDUCTOR PACKAGE

CROSS-REFERENCE TO RELATED APPLICATION

This application claims the benefit of Korean Patent Application No. 2012-0021788, filed on Mar. 2, 2012 in the Korean Intellectual Property Office, the disclosure of which is incorporated herein by reference in its entirety.

BACKGROUND

1. Field

One or more embodiments of the present disclosure relate to manufacturing a semiconductor package.

2. Description of the Related Art

In general, a process for manufacturing a semiconductor package involves electrically connecting chips (made by a wafer process) to each other to be used as an actual electronic component. The chips are sealed and packaged in order to protect them from damage caused by external impact.

One process known as a molding process involves mounting a semiconductor chip, which is separated from a wafer, on a Printed Circuit Board (PCB) or a lead frame. The semiconductor device is then sealed after electrical connections are completed.

One type of molding process involves using a transfer molding, that uses an Epoxy Molding Compound (EMC). The EMC may be a molding resin that demonstrates economical efficiency, lends itself well to mass productivity, and has anti-absorptiveness properties.

One type of transfer molding manufactures a semiconductor package by heating a tablet which is in a solid state. The tablet is melted to have a certain viscosity and then is injected into the cavity of a mold where it hardens. A semiconductor device is interposed in the hardened material. While this process has proved to be beneficial for some applications, the equipment used to implement the process has drawbacks, for example, in terms of size, complexity, and cost.

SUMMARY

In accordance with one embodiment, a semiconductor package manufacturing apparatus is provided to include a transfer apparatus having a reduced size. In other embodiments, the apparatus may include additional features that may improve efficiency and/or cost or which may streamline the process for manufacturing semiconductor devices.

In accordance with one embodiment, an apparatus for manufacturing a semiconductor package by molding a semiconductor device having a semiconductor chip mounted thereto includes at least one mold, a rotating unit and a transfer apparatus. The at least one mold may have a first mold, a second mold, and a cavity that is formed by matching the first mold to the second mold in shape so as to mold the semiconductor device. The rotating unit may be provided at one end thereof with the at least one mold mounted and configured to rotate on a rotating axis. The transfer apparatus may be mounted in between the mold and the rotating axis to supply a molding resin to an inside the cavity by use of a centrifugal force as the rotating unit rotates on the rotating axis.

The transfer apparatus may further include a pressure unit that is accommodated at an inside the mold to apply a pressure on the molding resin so that the molding resin is supplied to an inside the cavity.

The transfer apparatus may further include a transfer mass configured to increase a mass of the transfer apparatus so that a force applied on the molding resin by the pressure unit is increased.

The transfer apparatus may further include a connecting unit configured to connect the pressure unit to the transfer mass. The transfer mass may be disposed at an outside the mold. The transfer mass may be disposed at an inside the mold, and the transfer mass may be integrally formed with the pressure unit. The transfer mass may be disposed at an inner side of a radial direction of the mold.

The rotating unit may include a first end portion, and the at least one mold may be mounted at the first end portion of the rotating unit. The rotating unit may include a second end portion provided at an opposite side to the first end portion. The apparatus may further include a balance mass disposed at the second end portion so that the rotating unit rotates smoothly by balancing the mass with the mold. The mold may further include an accommodating unit formed at an inside the mold to accommodate a portion of the transfer apparatus.

In accordance with another embodiment, an apparatus for manufacturing a semiconductor package includes a rotating unit, at least one mold, and a transfer mass. The rotating unit may be configured to rotate on a rotating axis. The at least one mold may be configured to rotate along with the rotating unit while being mounted at an end portion of the rotating unit, and configured to mold a semiconductor device. The transfer mass may be mounted to the at least one mold, and configured for a molding resin to entirely spread to a cavity by applying a pressure on the molding resin in a centrifugal direction as the at least one mold is rotated.

The transfer mass may be disposed in between the mold and the rotating axis with respect to a centrifugal direction.

The rotating unit may include a first body and a second body that are provided in an elongated manner. The first body and the second body may be disposed to intersect with each other at a central portion of the rotating unit.

The at least one mold may be mounted on at least one of an end portion of the first body and an end portion of the second body.

In accordance with the present disclosure, by using a relatively simple rotating unit, a transfer apparatus may apply a sufficient force of pressure to a molding resin such that the molding resin is injected into an inside a cavity.

In addition, by simplifying the size and structure of a transfer apparatus, efficiency in using space may be enhanced.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims.

DETAILED DESCRIPTION OF EXAMPLE EMBODIMENTS

Figure 1:
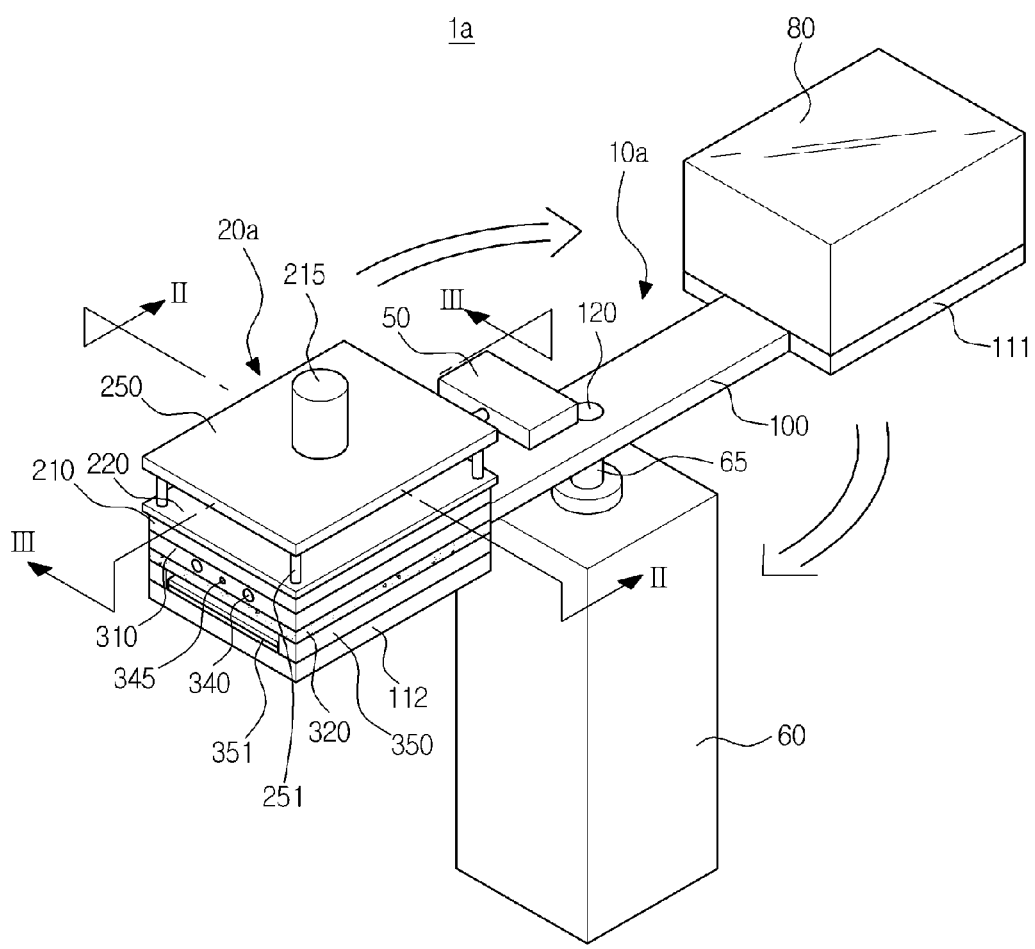
FIG. 1 is a perspective view illustrating a first embodiment of an apparatus for manufacturing a semiconductor package.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

In the drawings, it is understood that the thicknesses of layers and regions may be exaggerated for clarity. It will also be understood that when a layer is referred to as being "on" another layer or substrate, it can be directly on the other layer or substrate or intervening layers may also be present. Like reference numerals in the drawings denote like elements, and thus their description will not be repeated. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting of example embodiments. As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. Reference will now be made in detail to the embodiments of the present disclosure, examples of which are illustrated in the accompanying drawings, wherein like reference numerals refer to like elements throughout.

FIG. 1 is a perspective view illustrating a first embodiment of an apparatus for manufacturing a semiconductor package. As illustrated on FIG. 1, an apparatus for manufacturing a semiconductor package includes a rotating unit 10a, a mold 20a mounted at the rotating unit 10a, a driving apparatus 60 to supply a driving force to the rotating unit 10a for the rotating unit 10a to rotate, and a balance mass 80 configured to balance a weight, that is mass, with the mold 20a so that the rotating unit 10a may rotate smoothly.

The driving apparatus 60 generates a rotating force so that the rotating unit 10a may rotate. The driving apparatus 60 may be an apparatus that generates a rotating force such as a motor. The driving apparatus 60 is provided with a rotating shaft 65 to deliver the driving force that is generated by the driving apparatus 60 to the rotating unit 10a.

The rotating unit 10a is provided with a rotating axis 120 which includes a hole to allow for connection of the rotating shaft 65 of the driving apparatus 60 to a center of rotation of the rotating unit 10a. As the rotating shaft 65 of the driving apparatus 60 is coupled to the rotating axis 120, the driving force that is generated by the driving apparatus 60 is delivered to the rotating unit 10a through the rotating shaft 65, and thus the rotating unit 10a is rotated.

The rotating unit 10a includes a body 100 extendedly formed in different (e.g., opposing) directions with respect to the rotating axis 120. Mounting units 111 and 112 are formed at end portions of the body 100, respectively, such that the mold 20a and the balance mass 80 are mounted to the mounting units 111 and 112. In one embodiment, the rotating unit 10a and/or body 100 is provided in a shape of a bar that is extendedly formed in lengthways as a whole. In other embodiments, unit 10a and/or body 100 may have another shape.

For example, body 100 may have one or more movable portions that swing or otherwise extend outwardly during rotation and which then move to a retracted position when rotation is ended. In the retracted position, unit 10a may have a smaller profile which may be beneficial for some applications. Movement from the retracted position to the extended position may occur based on rotational (e.g., centrifugal force), and movement from the extended position to the retracted position may be based on a force applied by a bias member (e.g., a spring) coupled to body 100.

In the example shown in FIG. 1, the body 100 is extendedly formed in opposing directions with respect to the rotating axis 120, and is formed in a way to sustain the weight of mold 20a and balance mass 80 that are respectively mounted at the mounting units 111 and 112.

The length of the body 100 is one element that may determine a centrifugal force of one embodiment of a transfer apparatus 50. The centrifugal force F may be determined, for example, based on the formula $F=mr\omega^2$, where the distance r from an object generating the centrifugal force to the center of the rotation may be based on the length of body 100. These and other features of the transfer apparatus 50 will be explained in greater detail below.

As indicated, end portions of the body 100 are coupled to mounting units 111 and 112, respectively, where mold 20a and balance mass 80 are mounted. In accordance with one embodiment, in order for the mold 20a and the balance mass 80 to be stably mounted, the mounting units 111 and 112 may each be provided with a width wider than that of the body 100. In one embodiment, the mounting units 111 and 112 are formed to have areas which correspond to areas of bottom surfaces of the mold 20a and the balance mass 80. In other embodiments, the areas of mounting units 111 and 112 may be different from areas of the bottom surface of mold 20a and 80, and/or the widths of body 100 and mass 80 may be equal to or less than the width of body 100.

In FIG. 1, the first mounting unit 111 and the second mounting unit 112 are shown to be formed in opposing directions to each other with respect to the rotating axis 120 of the rotating unit 10a. In this embodiment, the first mounting unit 111 is provided with the balance mass 80 mounted thereto, while the second mounting unit 112 is provided with the mold 20a mounted thereto.

The balance mass 80 is provided with a weight (mass) determined in advance so that the balance mass 80 may at least partially offset the weight (mass) of the mold 20a mounted at the second mounting unit 112. The counterbalance provided by balance mass 80 may be substantially equal to the weight (mass) of mold 20a or may different (less than or greater than) the weight (mass) of mold 20.

The balance mass 80 is mounted at the first mounting unit 111 that is formed at an opposite direction of the second mounting unit 112. Thus, the balance mass 80 and the mold 20a are formed in opposite directions to each other with respect to the rotating axis 120 of the rotating unit 10a.

If the balance mass 80 is not present, the portion of the body 100 at which the mold 20a is mounted has more weight (mass) in the body 100, thereby the body 100 may not be able to rotate smoothly. However, if the mold 20a and the balance mass 80 are balanced with respect to mass by the balance mass 80, the body 100 is then provided with a balance with respect to mass, thereby is able to rotate more smoothly. Hereinafter, the structure of the mold 20a will be explained with reference to FIGS. 2 to 3.

Figure 2:
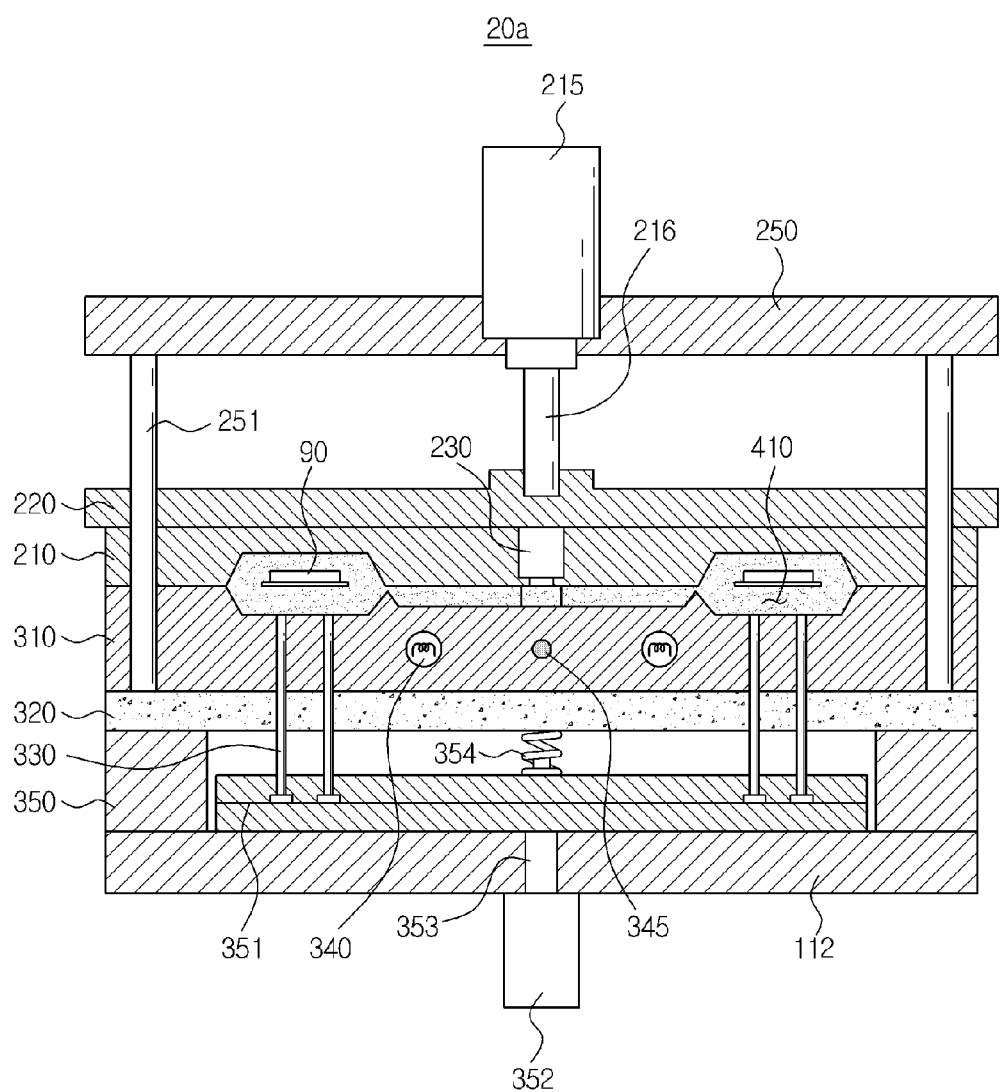
FIG. 2 is a cross-sectional view of an A-A line on FIG. 1.
Figure 3:
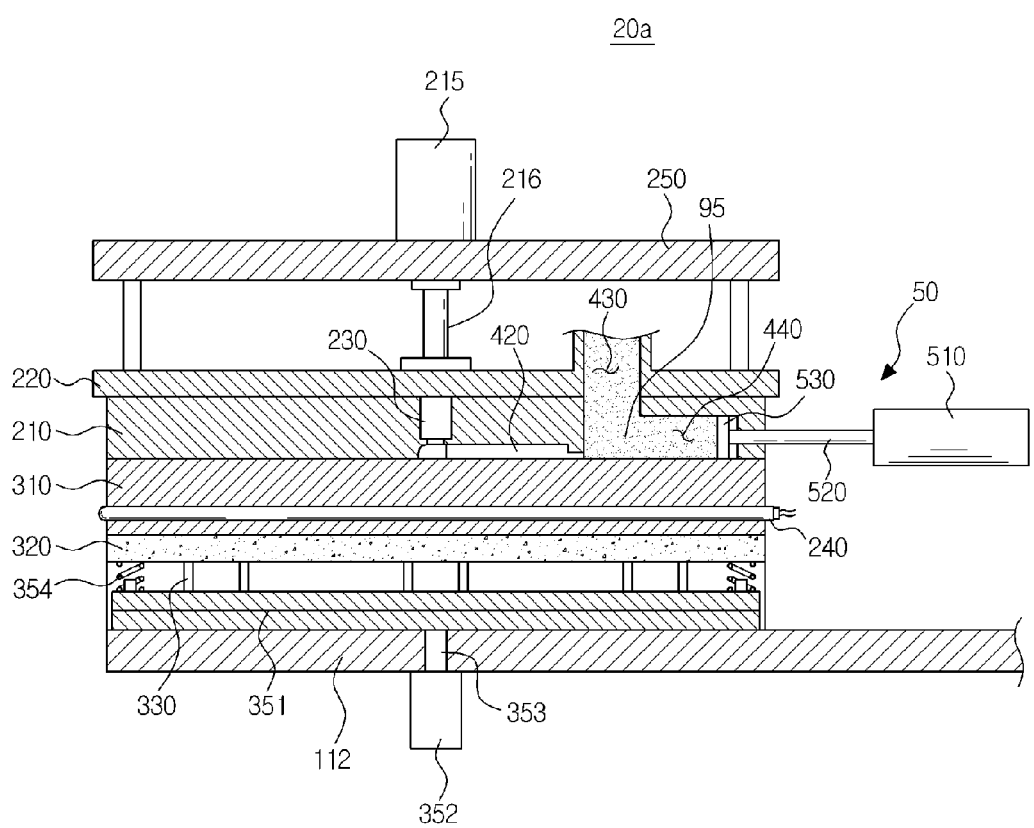
FIGS. 3 to 4 are cross-sectional views of a B-B line on FIG. 1.

FIG. 2 is a cross-sectional view of an A-A line on FIG. 1, and FIG. 3 is a cross-sectional view of a B-B line on FIG. 1. As illustrated on FIGS. 2 to 3, the mold 20a includes a first mold section 210, a second mold section 310, an eject pin 330, and the transfer apparatus 50. Other components a provided, for example, to support the aforementioned components or to drive these components.

The first mold section 210 is an upper portion mold that is positioned at an upper portion, while the second mold section 310 is a lower portion mold that is positioned at a lower portion of the first mold 210. A cavity 410, at which a molding is performed, is formed in a state when the first mold section 210 and the second mold section 220 are coupled and matched in shape.

In one embodiment, the first mold section 210 positioned at an upper portion serves as a movable mold while the second mold section 310 is fixed mold. In other embodiments, the first mold section 210 may be a fixed mold and the second mold section 310 may be a movable mold, or both sections may be movable.

A first mold supporting unit 220 may be provided at an upper portion of the first mold 210, and the first mold 210 is coupled to the first mold supporting unit 220.

An upper portion supporting unit 250 is disposed at an upper portion of the first mold supporting unit 220 to fixedly support a first mold driving unit 215 and a guide unit 251.

The guide unit 251 is mounted to corners (e.g., each of four corners) of the upper portion supporting unit 250 to guide vertical movement of the first mold 210 and first mold supporting unit 220. In one example embodiment, one end portion of the guide unit 251 may be mounted to a lower surface of the upper portion supporting unit 250, while the other end portion of the guide unit 251 is extendedly formed in a vertical direction to be mounted at the second mold 310.

The first mold driving apparatus 215 mounted at the upper portion supporting unit 250 generates a driving force so that the first mold 210 may move vertically. The first mold driving apparatus 215 may include, for example, a motor, a hydraulic cylinder, pneumatic cylinder, or other driver.

The first mold driving apparatus 215 is connected with a first shaft 216 to deliver a driving force of the first mold driving apparatus 215. One end portion of the first shaft 216 is coupled to the first mold driving apparatus 215, while the other end portion of the first shaft 216 is coupled to the first mold supporting unit 220. Thus, the driving force of the first mold driving apparatus 215 is delivered to the first mold supporting unit 220 through the first shaft 216. As the first mold supporting unit 220 is moved vertically, the first mold 210 coupled to the first mold supporting unit 220 also is moved vertically.

The first mold 210 is moved downward to a position at which the first mold 210 is coupled and matched to the second mold 310 in shape, and moved upward to a position at which the first mold supporting unit 220 makes contact with the upper portion supporting unit 250.

A centrifugal sensor 230 may be mounted at a certain location (e.g., at an inside the first mold 210) to measure a centrifugal force of the transfer apparatus 50, which is to be described later.

The second mold 310 is disposed at a lower side of the first mold 210. As previously explained, in one embodiment, the second mold 310 is fixed and only the first mold 210 is moved vertically.

A heater 340 is mounted at a certain location (e.g., inside the second mold 310) to apply heat to a molding resin 95, which is inside a cavity 410 formed when the first mold section 210 and the second mold section 310 are brought together. As a result of the heat, the molding resin 95 is converted to a molten state having a certain liquidity and viscosity.

In one embodiment, two heaters 340 are included each having a certain shape (e.g., a bar) extendedly formed in same or different directions inside the second mold section 310. In other embodiments, heaters with a different shape or a different number of heaters may be included. Also, while FIG. 2 shows that heater 340 is located inside mold section 310, the heater may be located externally to both molds, may be located on mold section 210, or may be coupled to the mold(s) at different locations.

A temperature sensor 345 may be mounted at an inside second mold section 310, in addition to the heater 340, to measure a temperature therein. In other embodiments, the temperature sensor may be at a different location.

A heat radiating panel 320 may be mounted at a lower end portion of the second mold section 310. The heat radiating panel 320 may prevent heat generated from heater 340 at an inside the second mold 310 from being delivered to other components.

A heat radiating panel supporting unit 350 may be disposed between the second mounting unit 112 and the heat radiating panel 320 to form a space for an eject pin 330 to move vertically. According to one embodiment, the heat radiating panel supporting unit 350 may be provided in two units. The two units of heat radiating panel supporting unit 350 may be mounted at different or opposite corners of the radiator panel 320 and the second mounting unit 112 that face each other. Thus, a space for the ejector pin 330 to move is formed in between the two units of heat radiating panel supporting unit 350. In other embodiments, the heat radiating panel supporting unit may be provided in more than two units or even a single unit that traverses all or a portion of a perimeter of mold 20a.

After the molding is completed, the ejector pin 330 may perform a function in separating a semiconductor package (e.g., 90 in FIG. 2 or 91 in FIG. 11) from the mold 20a. A portion of the ejector pin 330 may be installed to penetrate an inside the second mold 310, while the remaining portion of the ejector pin 330 may protrude to a lower end portion of the heat radiating panel 320 and may be coupled to a pin supporting unit 351.

A pin driving apparatus 352 is mounted to a lower end portion of the second mounting unit 112. The pin driving apparatus 352 may be provided with a second shaft 353 connected thereto to deliver the driving force of the pin driving apparatus 352 to the pin supporting unit 351. One end portion of the second shaft 353 may be connected to the pin driving apparatus 352, while the other end portion of the second shaft 353 may be connected to the pin supporting unit 351.

The driving force generated from the pin driving apparatus 352 is delivered to the pin supporting unit 351 through the second shaft 353 to move the pin supporting unit 351 vertically. As a result of such, the ejector pin 330 coupled to the pin supporting unit 351 also is moved vertically.

When the eject pin 330 is moved to a lower portion or position, an upper end portion of the eject pin 330 may not protrude to an upper portion or position of the second mold section 310 (that is, an inside the cavity 410). But, when the eject pin 330 is moved to an upper portion or position by the driving force of the pin driving apparatus 352, an upper end portion of the eject pin 330 may protrude inside the cavity 410 to separate the semiconductor package (91 in FIG. 11) from the second mold section 310.

In operation, the first mold section 210 and the second mold section 310 are brought together to form the cavity 410 to allow molding to take place inside mold 20a. At this time, a supply unit 430, an accommodating unit 440 to accommodate a portion of the transfer apparatus 50, and a runner unit 420 connecting the cavity 410 to the supply unit 430. A molding resin is injected into the supply unit 430. The molding resin may include a molding resin in a solid state and/or a molding resin in a liquid state. The molding resin in a solid state may include, for example, an Epoxy Molding Compound (EMC) which may be melted by the heater.

The molding resin 95 supplied to the supply unit 430 is injected into the cavity 410 through the runner unit 420. A semiconductor device 90 is disposed at the cavity 410, and molding is completed when the molding resin 95 surrounds the semiconductor device 90 and hardens. A more detailed example of the molding process will be explained in connection with FIGS. 7 to 11.

The transfer apparatus 50 may perform a function of injecting the molding resin 95 into the cavity 410 from the supply unit 430 through the runner unit 420. In accordance with one embodiment, the transfer apparatus 20 may include a pressure surface or unit 530 to directly apply a pressure on the molding resin 95, a transfer mass 510 to generate a centrifugal force by a rotation of the rotating unit 10a, and a connecting unit 520 to connect the transfer mass 510 to the pressure unit 530.

In one embodiment, the transfer mass 510 is disposed at a location outside the mold 20a. For example, referring to FIG. 1, with reference to the outside the mold 20a, the transfer mass 510 may be disposed at an outside the mold 20a at a location adjacent to or in alignment with the rotating axis 120 of the rotating unit 10a. In this arrangement, the rotating unit 10a is rotated to generate a centrifugal force to push the pressure unit 530 to inject molding resin 95 into the cavity 410 when the rotating unit is rotated.

As indicated, the centrifugal force F may be based on the formula $F=mr\omega^2$. In this formula, m corresponds to the mass of the transfer mass 510 and may be taken into consideration in determining the amount of the centrifugal force to be applied. By setting or controlling the mass of the transfer mass 510, the size of a centrifugal force may be controlled.

The pressure surface or unit 530 may be disposed at accommodating unit 440 at a location inside mold 20a. The pressure unit 530 may make direct contact with the molding resin 95 inside the accommodating unit 440 and applies pressure on molding resin 95 while making direct contact with the molding resin 95.

The connecting unit 520 connects the pressure unit 530 (which is disposed at an inside the accommodating unit 440) to the transfer mass 510 (which is disposed at an outside the mold 20a). At the same time, the connecting unit 520 performs a function in delivering the centrifugal force of the transfer mass 510 to the pressure unit 530. Hereinafter, by referring to FIGS. 3 to 4, the operation of the transfer apparatus 50 will be explained.

Figure 4:
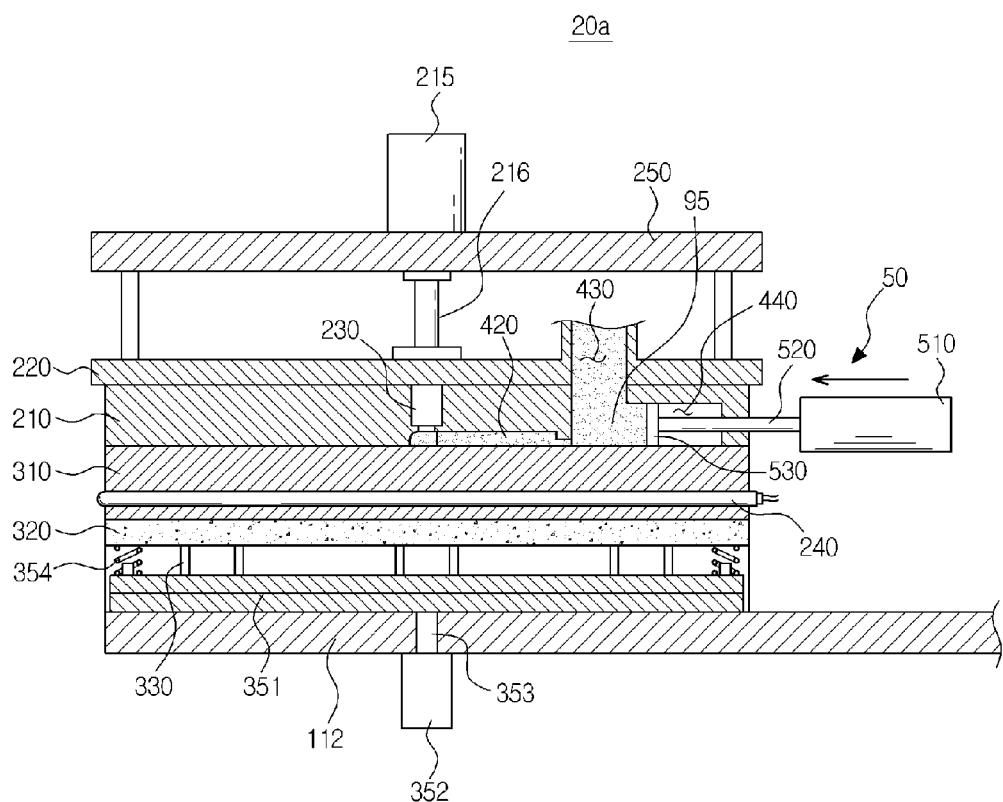

FIG. 4, similar to FIG. 3 is a cross-sectional view of a B-B line on FIG. 1. As illustrated on FIGS. 3 to 4, the transfer apparatus 50 is movably installed. In particular, the pressure unit 530 of the transfer apparatus 50 is moved inside the accommodating unit 440 within the mold 20a.

The right side of the drawing may be referred to as the direction of the rotating axis 120 of the rotating unit 10a, and the left side of the drawing may be referred to as the opposite direction of the rotating axis 120 of the rotating unit 10a. At the same time, the left side of the drawing may be referred to as a centrifugal direction as the rotating unit 10a is rotated.

As illustrated on FIG. 3, the molding resin 95 is supplied through the supply unit 430. The supply unit 430 and the accommodating unit 440 are filled with or otherwise receive the molding resin 95. At this time, the transfer apparatus 50 is recessed toward a direction of the rotating axis 120.

FIG. 4 is the drawing illustrating a state of the rotating unit 10a being rotated by the driving apparatus 60. As the rotating unit 10a is rotated, the mold 20a that is mounted at the second mounting unit 112 of the rotating unit 10a and the transfer apparatus 50 that is mounted at the mold 20a are also rotated.

By the rotation of the transfer apparatus 50, a centrifugal force is generated at the transfer mass 510 that is provided with a predetermined mass. The centrifugal force is generated in a direction that is farther away from the rotating axis 120, which is the rotational center of the rotating unit 10a, that is, in the centrifugal direction of the rotating unit 10a.

As a result, the transfer apparatus 50 as a whole is moved in a centrifugal direction and pressure unit 530 positioned at the accommodating unit 440 is moved toward a centrifugal direction. According to the movement of the pressure unit 530, the molding resin 95 that is charged at the supply unit 430 and the accommodating unit 440 is applied with a pressure in a centrifugal direction, and is injected into the cavity 410 following the runner unit 420.

As previously indicated, the centrifugal force F may be based on the formula $F=mr\omega^2$. In this formula, m represents the overall mass of the transfer apparatus 50 that includes the transfer mass 510 and the pressure unit 530, and r represents the distance from the rotating axis 120 of the rotating unit 10a to the transfer apparatus 50. Also, $\omega$ represents an angular speed of the rotating unit 10a that is rotated by the driving apparatus 60.

By controlling one or more of these values, the size of the centrifugal force is determined. For example, by controlling or setting the overall mass of the transfer mass 50, the distance from the rotating axis 120 of the rotating unit 10a to the transfer apparatus 50, and/or the angular speed of the rotating unit 10a, the size of the centrifugal force may be controlled to correspond to a certain or desired value.

Figure 5:
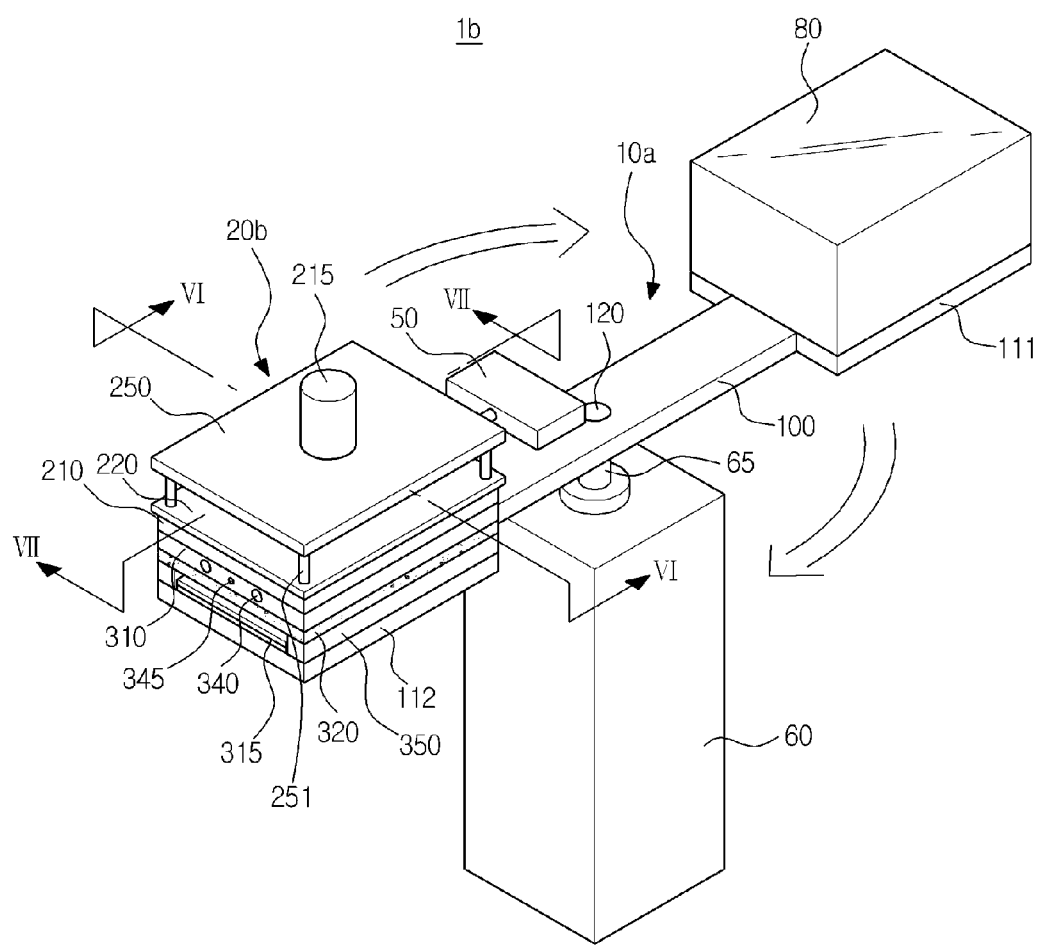
FIG. 5 is a drawing illustrating a second embodiment of an apparatus for manufacturing a semiconductor package.

FIG. 5 is a drawing illustrating a second embodiment of an apparatus for manufacturing a semiconductor package having a mold. As illustrated on FIG. 5, an apparatus for manufacturing a semiconductor package includes the rotating unit 10a, a mold 20b mounted at the rotating unit 10a, the driving apparatus 60 to supply a driving force so that the rotating unit 10a is rotated, and the balance mass 80 for the rotating unit 10a to rotate smoothly by balancing mass with the mold 20b. However, an internal structure of mold 20b is formed differently from FIG. 1

The driving apparatus 60 generates a rotating force so that the rotating unit 10a is rotated. The rotating unit 10a is provided with the rotating axis 120 having the shape of a hole formed thereto so that the rotating shaft 65 of the driving apparatus 60 may be connected. As the rotating shaft 65 of the driving apparatus 60 is coupled to the rotating axis 120, the driving force generated by the driving apparatus 60 is delivered to the rotating unit 10a through the rotating shaft 65, and thus the rotating unit 10a is rotated.

The rotating unit 10a is formed with the body 100 and with the mounting units 111 and 112, which are formed at both end portions of the body 100, for the mold 20b and the balance mass 80 are mounted thereto.

As the mounting units 111 and 112 are formed at end portions of the body 100, the mounting units 111 and 112 include the first mounting unit 111 and the second mounting unit 112. That is, the first mounting unit 111 and the second mounting unit 112 are formed at an opposite direction to each other, while having the rotating axis 120 of the rotating unit 10a as a reference. In the present embodiment, the first mounting unit 111 is provided with the balance mass 80 mounted thereto and the second mounting unit 112 is provided with the mold 20b mounted thereto. By the balance mass 80, the mold 20b and the balance mass 80 are balanced with reference to mass, and by such, the body 100 is balanced as a whole so that the body 100 is rotated smoothly.

Figure 6:
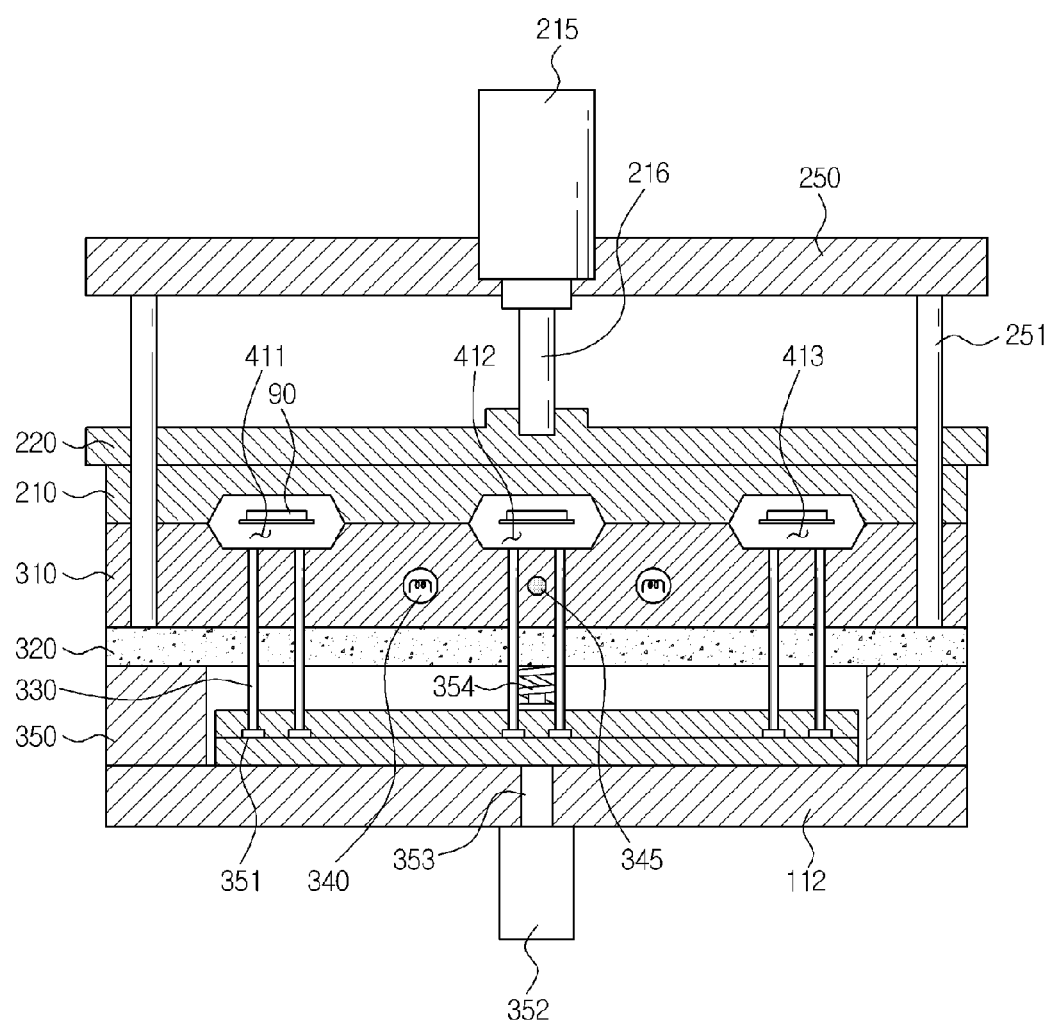
FIG. 6 is a cross-sectional view of a C-C line on FIG. 5.

FIG. 6 is a cross-sectional view of a C-C line on FIG. 5. As illustrated on FIG. 6, the mold 20b includes the first mold section 210, the second mold section 310, the eject pin 330, and the transfer apparatus 50.

The first mold section 210 is an upper portion mold that is positioned at an upper portion, while the second mold section 310 is a lower portion mold that is positioned at a lower portion of the first mold section 210. A cavity 410 is formed when the first mold section 210 and the second mold section 220 are brought together. As previously explained, the first mold section 210 may be a fixed mold while the second mold section 310 may be a movable mold. In other embodiments, first mold section 210 may be movable and second mold section 310 may be fixed, or both mold sections may be movable.

An upper portion of the first mold section 210 is provided with a first mold supporting unit 220, and the first mold section 210 is coupled to the first mold supporting unit 220.

An upper portion of the first mold supporting unit 220 is provided with an upper portion supporting unit 250 disposed thereto to fixedly support a first mold driving unit 215 and a guide unit 251. The corners (e.g., all four or fewer than four corners) of the upper portion supporting unit 250 may each be provided with the guide unit 251 mounted thereto to guide the vertical movements of the first mold 210 and the first mold supporting unit 220. One end portion of the guide unit 251 is connected to a lower surface of the upper portion supporting unit 250, while the other end portion of the guide unit 251 is extendedly formed in a vertical direction to be mounted at the second mold 310.

The first mold driving apparatus 215 is connected with a first shaft 216 to deliver a driving force of the first mold driving apparatus 215. One end portion of the first shaft 216 is coupled to the first mold driving apparatus 215, while the other end portion of the first shaft 216 is coupled to the first mold supporting unit 220.

The driving force of the first mold driving apparatus 215 is delivered to the first mold supporting unit 220 through the first shaft 216. By such, as the first mold supporting unit 220 and the first mold section 210 are moved vertically at the same time.

An inside the second mold section 310 is provided with the heater 340 mounted thereto, and the heater 340 changes the molding resin 95, which is charged at an inside the cavity 410, to be provided with a molten state having liquidity and certain viscosity.

A lower end of the second mold section 310 is provided with the heat radiating panel 320 mounted thereto, so that the heat generated from the heater 340 is prevented from being delivered to other components.

The heat radiating panel supporting unit 350 is disposed in between the second mounting unit 112 and the heat radiating panel 320. A space is formed in between the two units of the heat radiating panel supporting unit 350, which are installed in a way to face each other, for the ejector pin 330 to move.

A portion of the ejector pin 330 is installed to penetrate an inside the second mold section 310, while the remaining portion of the ejector pin 330 is protruded to a lower end portion of the radiator panel 320 and coupled to the pin supporting unit 351.

The driving force generated by the pin driving apparatus 352 (that is mounted at a lower end portion of the second mounting unit 112) is delivered to the pin supporting unit 351 and the eject pin 330 through the second shaft 353 that is connected to the pin driving apparatus 352. As the eject pin 330 is moved vertically, an upper end portion of the elect pin 330 protrudes inside the cavity 410 to separate the semiconductor package (91 in FIG. 11) from the second mold 310.

Figure 7:
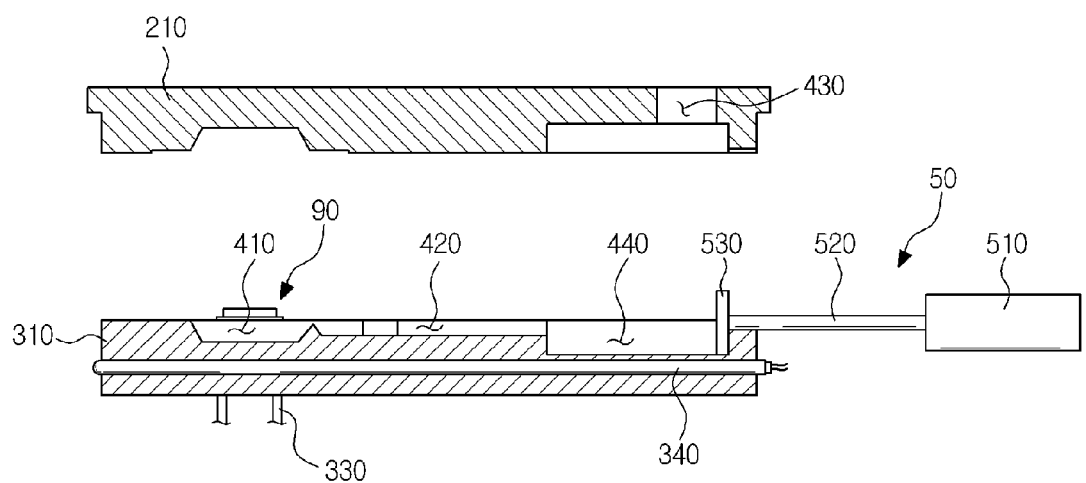
FIGS. 7 to 11 are cross-sectional views of a D-D line on FIG. 5.

FIG. 7 is a cross-sectional view of a D-D line on FIG. 5. As illustrated on FIGS. 6 to 7, an interior of the mold 20b includes cavities 411, 412, and 413 at which a molding is performed, the supply unit 430 into which the molding resin is injected, and the runner unit 420 connecting the cavities 411, 412, and 413 and the supply unit 430.

In this embodiment, a total of the three cavities 411, 412, and 413 are formed. However, in other embodiments a different number of cavities may be included.

The transfer apparatus 50 includes the pressure surface or unit 530 to directly apply a pressure on the molding resin 95, transfer mass 510 to generate a centrifugal force based on rotation of the rotating unit 10a, and connecting unit 520 to connect the transfer mass 510 and the pressure unit 530.

With reference to the outside the mold 20a, the transfer mass 510 is disposed at an outside the mold 20a that is adjacent to the rotating axis 120 of the rotating unit 10a. The pressure unit 530 is disposed at the accommodating unit 440 at an inside the mold 20b, and the connecting unit 520 connects the pressure unit 530 (which is disposed at an inside the accommodating unit 440) to the transfer mass 510 (which is disposed at an outside the mold 20b). Hereinafter, by referring to FIGS. 7 to 11, the operation of the mold 20b and the transfer apparatus 50 will be explained.

FIGS. 7 to 11 are cross-sectional views of a D-D line on FIG. 5. In order to mainly illustrate the motions of the mold 20b and the transfer apparatus 50, other components are omitted from being illustrated on FIGS. 7 to 11.

FIG. 7 is a drawing illustrating an open state as the first mold 210 and the second mold 310 separated from each other. As illustrated on FIG. 7, the first mold 210 and the second mold 310 are separated from each other. In the open state, the semiconductor device 90, which is a subject of the molding, is placed at the cavity 410.

The semiconductor device 90 may include a chip on a printed circuit board, substrate, or wafer. The chip is coupled to the printed circuit board, for example, by a solder ball or other manner of connection. In other embodiments, the semiconductor device may include a chip connected to a lead frame with a wire. In still other embodiments, other types of semiconductor devices may be subject to molding by the embodiments of the apparatus disclosed herein.

Figure 8:
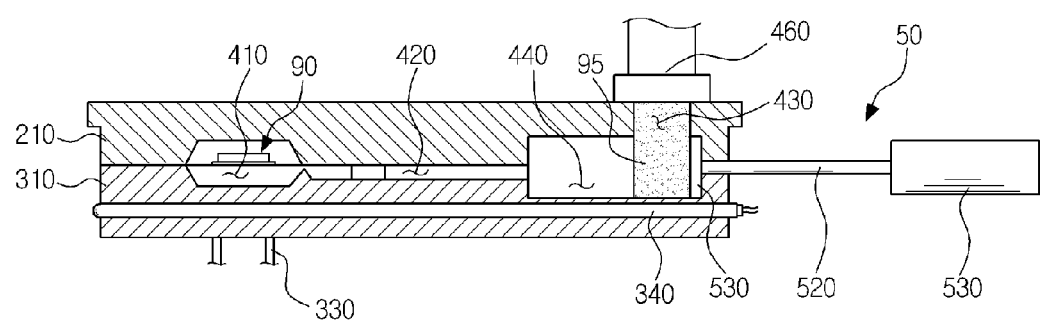

FIG. 8 is a drawing illustrating a closed state of the first mold section 210 and the second mold section 310 when brought together. As illustrated on FIG. 8, the first mold section 210 and the second mold section 310 are coupled to each other and thus the mold 20b is closed. The first mold section 210 and the second mold section 310 is provided with the cavity 410 formed thereinbetween.

As previously explained, an inside the mold 20b is provided with the cavity 410, the supply unit 430, the accommodating unit 440, and the runner unit 420 formed therein. The molding resin 95 is supplied to the supply unit 430 by a plunger 460. The plunger 460 configured to perform a function to supply the molding resin 95 to the supply unit 430, and at the same time configured to close the supply unit 430 so that the molding resin 95 is not leaked to an outside the mold 20b even when the rotating unit (10a in FIG. 5) is rotated.

The molding resin 95 may be provided in a liquid form or a solid form. In a case of the molding resin 95 being in a solid state, as previously researched, the molding resin 95 may be an Epoxy Molding Compound (EMC).

In a case of the molding resin 95 being in a solid state, prior to being supplied to the supply unit 430, the molding resin 95 is pre-heated so that the molding resin 95 may be changed to be in a molten state in a short period of time after being injected into the supply unit 430. Alternatively, the molding resin 95, after being changed to a completely molten state, may be supplied to the supply unit 430 in a liquid state.

Figure 9:
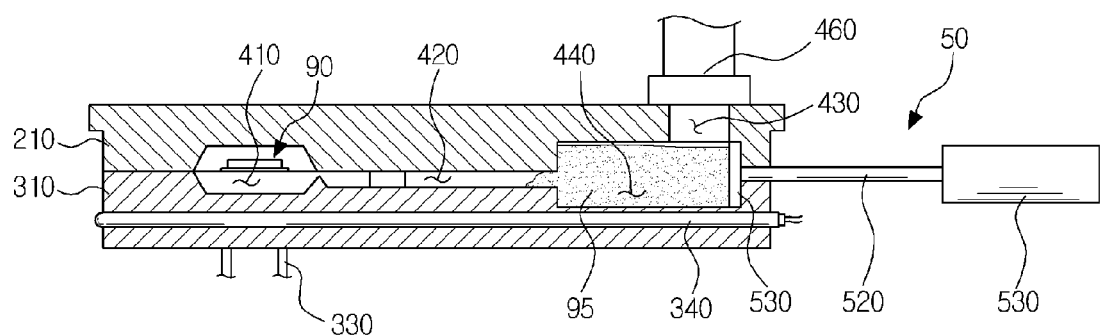

FIG. 9 is a drawing illustrating a molten state of the molding resin 95 by the heater 340. As illustrated on FIG. 9, the molding resin 95 is changed to a molten and liquid state. However, even in a case of the molding resin 95 that is molten, viscosity thereof is not completely absent and, thus, the molding resin 95 may not be able to completely move from the accommodating unit 440 to the cavity 410. In addition, since the molding resin 95 may be completely filled inside the cavity 410 to obtain a semiconductor package having a shape as desired, a molding may not be performed in the state as such. (In other embodiments, a completely filled cavity 410 may be not performed or necessary). In order for the molding resin 95 to completely, or more completely, fill the cavity 410, the molding resin 95 may be pressed.

Figure 10:
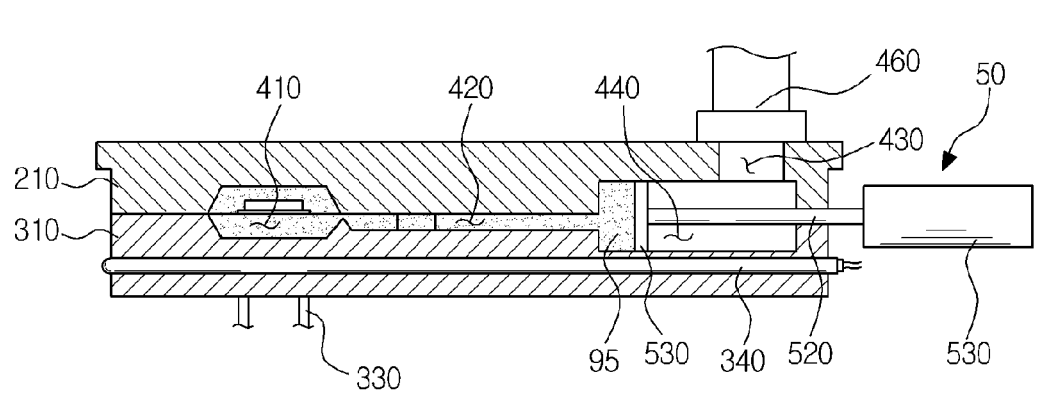

FIG. 10 is a drawing illustrating a state of the molding resin 95 applied with a pressure by a transfer apparatus and injected into the cavity 410. As illustrated on FIG. 10, as the rotating unit 10a (FIG. 5) is rotated, the mold 20b mounted to the body 100 (FIG. 5) of the rotating unit 60 and the transfer apparatus 50 mounted to the mold 20b are also rotated.

A centrifugal force is generated by the rotation, and thus the transfer apparatus 50 is moved in a centrifugal direction, that is, toward an outer side in a radial direction of the rotating unit 60. According to the movement of the transfer apparatus 50, the pressure unit 530 applies a pressure on the molding resin 95, and the molding resin 95 is injected into the cavity 410, preferably entirely filling the cavity or filling the cavity to at least a desired degree.

Referring to FIGS. 9 to 10, the illustrations are shown as being performed in two steps, a first step of melting the molding resin 95 is completed, and when melting is completed a second step of apply pressured to the molding resin 95 by the pressure unit 530 as the rotating unit 60 rotates. These steps may be performed separately, but in other embodiments the melting and the pressing of the molding resin 95 may take place at the same time. That is, the heater 340 may be operated at the same time of rotation of the rotating unit 60.

Figure 11:
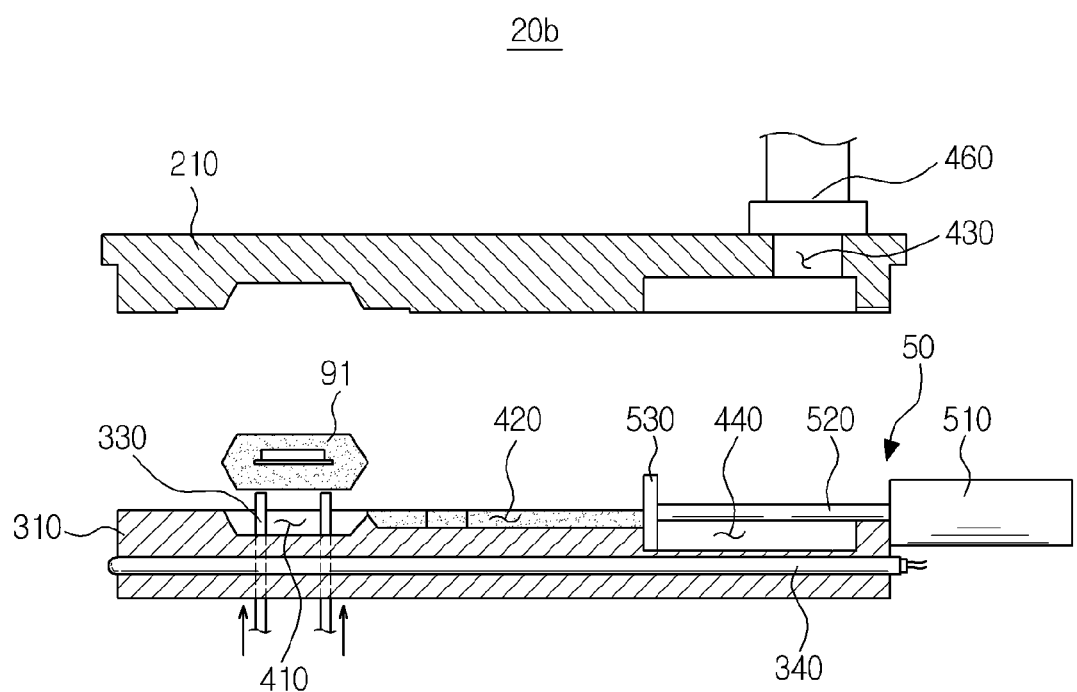

FIG. 11 is a drawing illustrating a process of separating the semiconductor package 91 having a molding completed from a mold. As illustrated on FIG. 11, after the molding resin 95 cooled off and hardened after the molding resin 95 has been injected into the cavity 410, the semiconductor package 91 is ready to be removed. To remove the semiconductor package 91, the first mold section 210 and the second mold section 310 are separated from each other and the semiconductor package 91 is changed into an open state.

In the open state, the eject pin 330 is ascended and an end portion of an upper side of the eject pin 330 is made to protrude inside the cavity 410. The ejector pin 330 separates the semiconductor package 91 from the second mold section 310.

Figure 12:
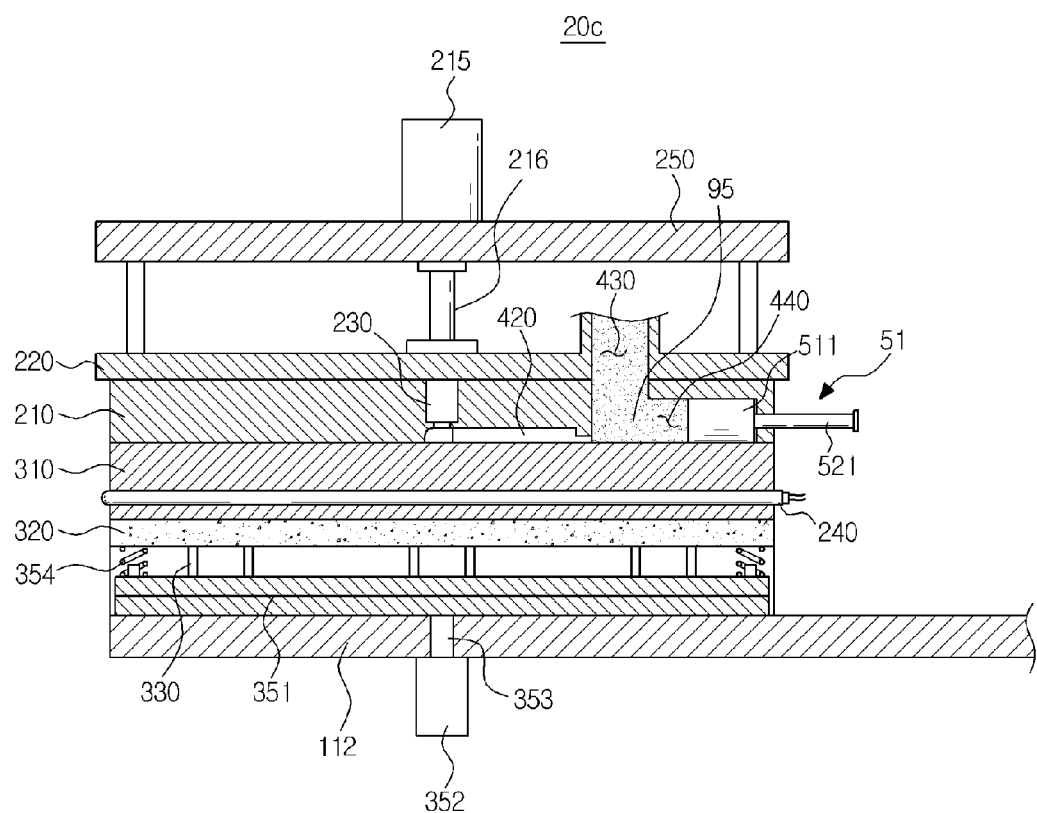
FIG. 12 is a cross-sectional view of a mold in accordance with a third embodiment.

FIG. 12 is a cross-sectional view of a mold in accordance with a third embodiment. As illustrated on FIG. 12, a mold 20c includes the first mold section 210, the second mold section 310, the eject pin 330 and the transfer apparatus 50.

When the first mold section 210 and the second mold section 310 are brought together, a space is formed at which molding is performed. The space includes the cavity 410 at which a molding is performed, the supply unit 430 to which a molding resin is injected, the accommodating unit 440 to accommodate a portion of the transfer apparatus 10a, and the runner unit 420 connecting the cavity 310 and the supply unit 430.

The transfer apparatus 51 includes the transfer mass 510 configured to directly apply a pressure on the molding resin 95 while generating a centrifugal force by a rotation of the rotating unit 10a, and the connecting unit 520 connected to the transfer mass 510 and protruded to an outside the mold 20c. The transfer mass 510 is disposed at the accommodating unit 440 at an inside the mold 20c.

An upper portion of the first mold section 210 is provided with the first mold supporting unit 220 thereto, and the first mold section 210 is coupled to the first mold supporting unit 220.

An upper portion of the first mold supporting unit 220 is provided with the upper portion supporting unit 250 disposed thereto to fixedly support the first mold driving unit 215 and the guide unit 215. The four corners of the upper portion supporting unit 250 are provided with the guide unit 251 mounted thereto to guide the vertical movements of the first mold section 210 and the first mold supporting unit 220.

The first mold driving apparatus 215 is connected with the first shaft 216 to deliver a driving force of the first mold driving apparatus 215. One end portion of the first shaft 216 is coupled to the first mold driving apparatus 215, while the other end portion of the first shaft 216 is coupled to the first mold supporting unit 220.

An inside the second mold 310 is provided with a heater 340 mounted thereto, and performs a function in changing the state of the molding resin 95 to be provided with a molten state having liquidity.

A lower end portion of the second mold section 310 is provided with a heat radiating panel 320 mounted thereto to prevent the heat generated from the heater 340 from being delivered to other components.

The heat radiating panel supporting unit 350 is disposed in between the second mounting unit 112 and the heat radiating panel 320, and a space is formed in between the two units of the heat radiating panel supporting unit 350, which are installed in a way to face each other, for the ejector pin 330 to move. A portion of the ejector pin 330 is installed to penetrate inside the second mold section 310, while the remaining portion of the ejector pin 330 is protruded to a lower end portion of the radiator panel 320 and coupled to the pin supporting unit 351.

The driving force generated by the pin driving apparatus 352 that is mounted at a lower end portion of the second mounting unit 112 is delivered to the pin supporting unit 351 and the eject pin 330 through the second shaft 353 that is connected to the pin driving apparatus 352. As the eject pin 330 is moved upward, an upper end portion of the elect pin 330 protrudes inside the cavity 410, and separates the semiconductor package 91 having a molding completed from the second mold section 310.

Figure 13:
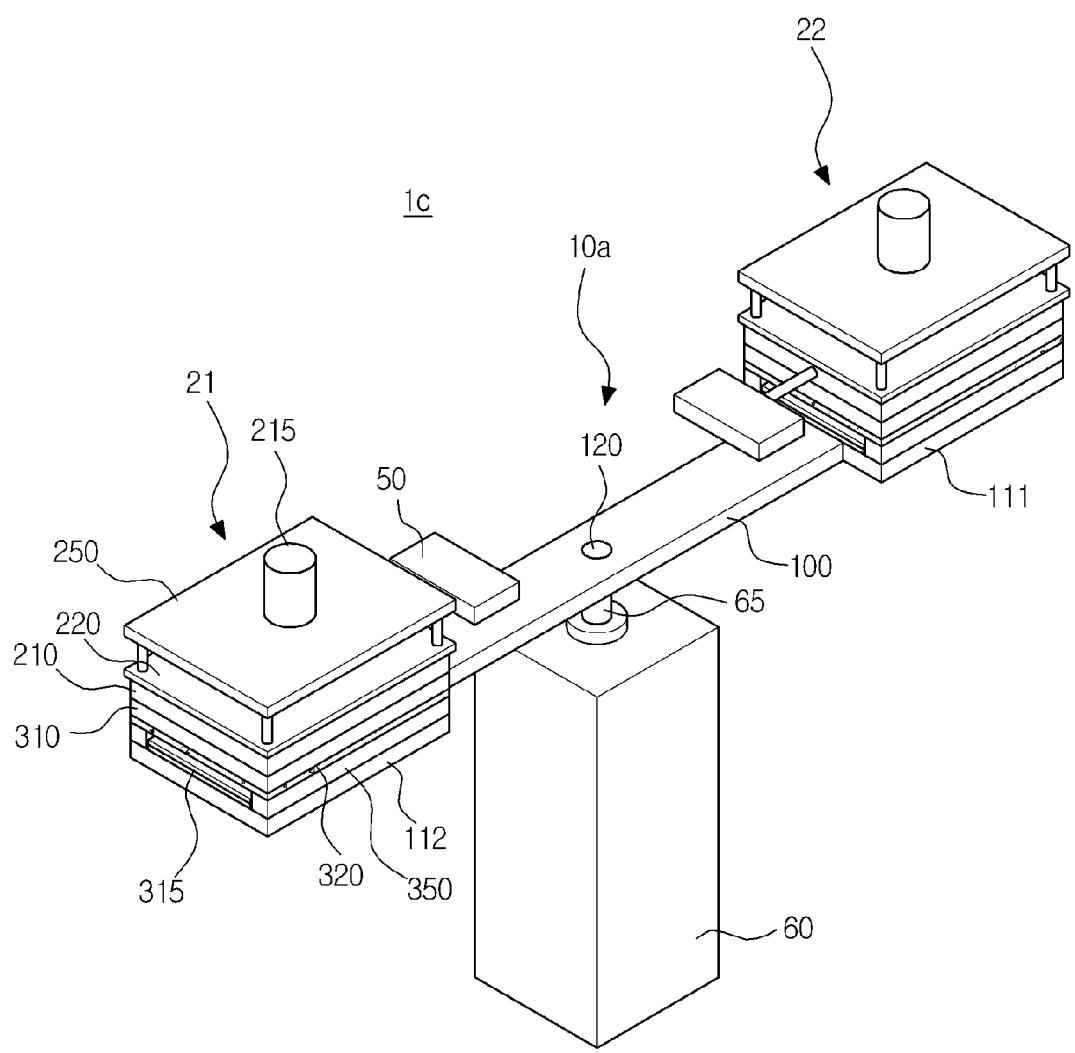
FIG. 13 is a perspective view illustrating a fourth embodiment of an apparatus for manufacturing a semiconductor package.

FIG. 13 is a cross-sectional view of a mold in accordance with a fourth embodiment. As illustrated on FIG. 13, an apparatus for manufacturing a semiconductor package 1c is composed of by including the rotating unit 10a, two units of the molds 21 and 22 mounted at the rotating unit 10a, and the driving apparatus 60 to supply a driving force for the rotating unit 10a to rotate.

The driving apparatus 60 generates a rotating force so that the rotating unit 10a may be rotated, and delivers the rotating force to the rotating unit 10a through the rotating shaft 65.

The rotating unit 10a is provided with the rotating axis 120 formed thereto so that the rotating shaft 65 of the driving apparatus 60 may be connected to the rotating center of the rotating unit 10a. The rotating axis 120 is provided with the rotating shaft 65 of the driving apparatus 60 coupled thereto. The rotating unit 10a includes the body 100 extendedly formed in different directions while having the rotating axis 120 as a reference, and the mounting units 111 and 112 formed at end portion of the body 100.

The end portions of the body 100 are provided with the mounting units 111 and 112 formed thereto, respectively, at which the mold 21 and the mold 22 are mounted, respectively.

The mounting units 111 and 112 are formed at the end portions of the body 100 and, thus, include the first mounting unit 111 and the second mounting unit 112. That is, the first mounting unit 111 and the second mounting unit 112 are formed in an opposite direction to each other while having the rotating axis 120 of the rotating unit 10a as a reference. In one embodiment, the first mounting unit 111 and the second mounting unit 112 are provided with the mold 21 and the mold 22 mounted thereto. The mold 21 and the mold 22 are in balance to each other with respect to mass, so that the rotating unit 10a may be rotated smoothly.

Figure 14:
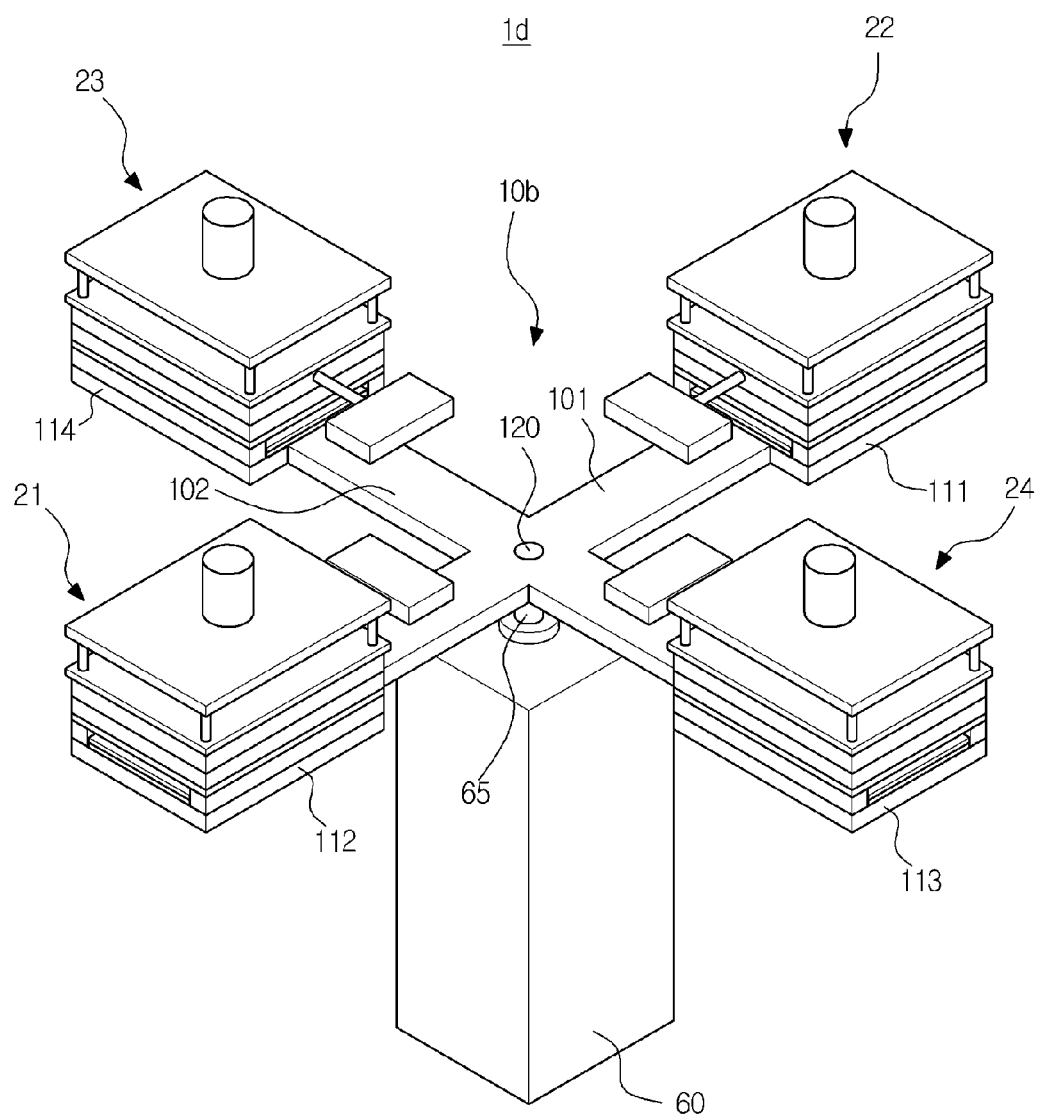
FIG. 14 is a perspective view illustrating a fifth embodiment of an apparatus for manufacturing a semiconductor package.

FIG. 14 is a perspective view illustrating a structure of an apparatus for manufacturing a semiconductor package in accordance with a fifth embodiment. In this embodiment, the difference from the fourth embodiment that is illustrated on FIG. 13 will be centrally explained.

As illustrated on FIG. 14, an apparatus for manufacturing a semiconductor package 1d is composed of by including a rotating unit 10b, four units of molds 21, 22, 23, and 24 that are mounted on the rotating unit 10b, and the driving apparatus 60 to supply a driving force for the rotating unit 10b to be rotated. The shape of the rotating unit 10b and the number of the molds are provided according to the shape of the rotating unit 10b are found to be different from the fourth embodiment.

The rotating unit 10b is provided with a rotating axis 120 formed thereto, and the rotating axis 120 is provided with a shape of a hole so that the rotating shaft 65 of the driving apparatus 60 may be connected to the center of the rotation of the rotating unit 10b. The rotating axis 120 is provided with the rotating shaft 65 of the driving apparatus 60 coupled thereto.

The rotating unit 10b includes a first body 101 extendedly formed in both directions with respect to the rotating axis 120, and a second body 102 extendedly formed to be intersected with the first body 101 with respect to the rotating axis 120. Each end portion of the first body 101 and the second body 102 is provided with mounting units 111, 112, 113, and 114 formed thereto.

The first body 101 and the second body 102 are illustrated in a way that the first body 101 and the second body 102 are disposed to perpendicularly intersect each other. However, as long as the first body 101 and the second body 102 are disposed in an intersecting manner, the first body 101 and the second body 102 being disposed while having a different angle to each other may be included in the aspect of the present disclosure.

The mounting units 111, 112, 113, and 114 are provided with the molds 21, 22, 23, and 24 mounted thereto, respectively. The four of the molds 21, 22, 23, and 24 are entirely balanced with respect to mass, so that the rotating unit 10b may be rotated smoothly.

Figure 15:
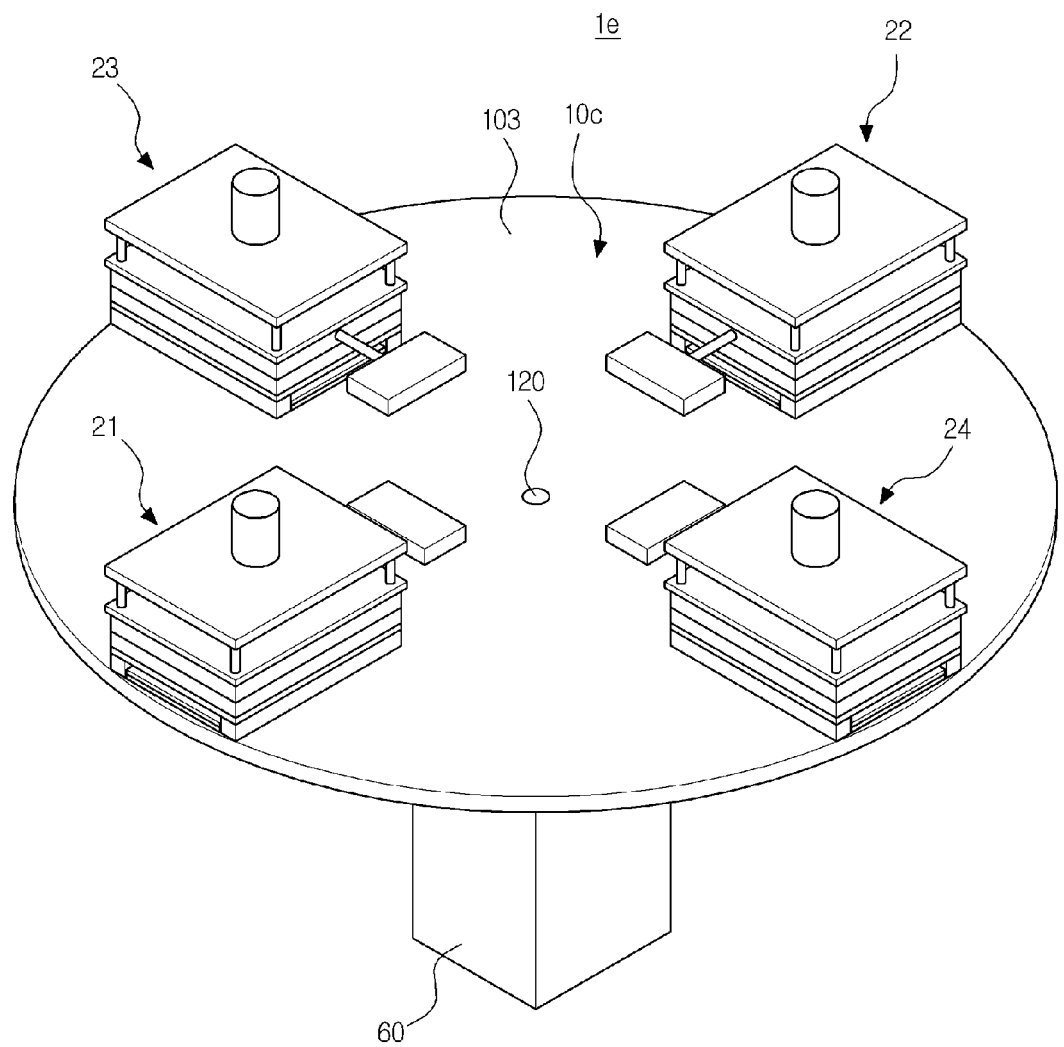
FIG. 15 is a perspective view illustrating a sixth embodiment of an apparatus for manufacturing a semiconductor package.

FIG. 15 is a perspective view illustrating a structure of an apparatus for manufacturing a semiconductor package in accordance with a sixth embodiment. In the embodiment as well, the difference from the fourth embodiment that will be centrally explained.

As illustrated on FIG. 15, an apparatus for manufacturing a semiconductor package 1e includes a rotating unit 10c, four units of the molds 21, 22, 23, and 24 that are mounted on the rotating unit 10c, and the driving apparatus 60 to supply a driving force for the rotating unit 10b to be rotated. The shape of the rotating unit 10c and the number of the molds provided according to the shape of the rotating unit 10c are found to be different from the fourth embodiment.

The rotating unit 10c is provided with a rotating axis 120 formed thereto, and the rotating axis 120 is provided with the rotating shaft (65 in FIG. 15) of the driving apparatus 60 coupled thereto. The rotating unit 10b includes a body 103 having a shape of a circular panel provided with the rotating axis 120 as a center. The body 103 in accordance with the embodiment of the present disclosure is not provided with a separate mounting unit.

The edge of the body 103 is provided with four units of the molds 21, 22, 23, and 24 arranged along the circumferential direction thereof while having a predetermined distance therebetween. The four of the molds 21, 22, 23, and 24 are entirely balanced with respect to mass, so that the rotating unit 10c may be rotated smoothly.

In this embodiment, a total of four units of the molds 21, 22, 23, and 24 mounted. However, in the case of the body 103 in this embodiment, since no separate mounting unit is present, as long as the balance with respect to mass among the molds is achieved, more than four units of the molds or less than four units of the molds may be mounted. By increasing the number of the molds mounted as such, more of the semiconductor package 91 may be manufactured in a single rotation.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An apparatus for manufacturing a semiconductor package, comprising:
    a first mold having a first mold section, a second mold section, and at least one cavity formed when the first mold section and the second mold section are brought together;
    a rotator coupled to the first mold and configured to rotate on a rotating axis; and
    a driver between the first mold and the rotating axis, the driver configured to supply a molding resin into the cavity based on a centrifugal force generated when the rotator rotates on the rotating axis; wherein the rotator includes:
    a first end coupled to the first mold; and
    a second end opposing the first end and coupled to a balance mass, the balance mass having a weight that at least partially offsets a mass of the first mold.

2. The apparatus of claim 1, wherein the driver includes
    a surface configured to apply pressure to the molding resin to supply the molding resin into the cavity.

3. The apparatus of claim 2, wherein the driver includes
    a transfer mass coupled to the surface to cause the surface to apply a force of a certain level to supply the molding resin into the cavity.

4. The apparatus of claim 3, wherein the driver includes
    a connector connected between the transfer mass and the surface and configured to transfer the force to the surface when the rotator rotates.

5. The apparatus of claim 4, wherein the transfer mass is outside the first mold.

6. The apparatus of claim 3, wherein the transfer mass is inside the first mold.

7. The apparatus of claim 3, wherein the transfer mass is disposed at an inner side of a radial direction of the first mold.

8. The apparatus of claim 1, wherein the first mold includes
    an accommodator within the first mold to accommodate a portion of the driver.

9. The apparatus of claim 1, further comprising:
    a heater to heat the molding resin to a molten state,
    the driver driving the molding resin in the molten state into the cavity between the first and second mold sections.

10. The apparatus of claim 1, wherein the first mold has a plurality of cavities when the first and second mold sections are brought together.

11. The apparatus of claim 1, further comprising:
    an ejector configured to eject a semiconductor package in the cavity when the first and second mold sections are separated from one another.

12. An apparatus for manufacturing a semiconductor package, comprising:
    a rotator configured to rotate on a rotating axis;
    a first mold configured to rotate along with the rotator; and
    a transfer mass coupled to the first mold and configured to apply a pressure to supply a molding resin into the first mold, the transfer mass moving from a first position to a second position based on a centrifugal force generated by rotation of the rotator; wherein the rotator includes:
    a first end coupled to the first mold; and
    a second end opposing the first end and coupled to a balance mass, the balance mass having a weight that at least partially offsets a mass of the first mold.

13. The apparatus of claim 12, wherein the transfer mass is between the first mold and the rotating axis.

14. The apparatus of claim 12, wherein the rotator includes
    a first body, and
    a second body coupled to the first body,
    the first body and the second body intersecting at a location which substantially corresponds to the rotating axis.

* * * * *